United States Patent
Bitzer et al.

(10) Patent No.: US 11,845,580 B2
(45) Date of Patent: Dec. 19, 2023

(54) METHOD AND DEVICE FOR PRODUCING AND INSPECTING A PACKAGE

(71) Applicant: KOCH Pac-Systeme GmbH, Pfalzgrafenweiler (DE)

(72) Inventors: Juergen Bitzer, Horb (DE); Jens Maier, Bad Rippoldsau (DE); Markus Eppler, Herzogsweiler (DE); Frank Helber, Haiterbach (DE)

(73) Assignee: KOCH PAC-SYSTEME GMBH, Pfalzgrafenweiler (DE)

( * ) Notice: Subject to any disclaimer, the term of this patent is extended or adjusted under 35 U.S.C. 154(b) by 0 days.

(21) Appl. No.: 17/533,492

(22) Filed: Nov. 23, 2021

(65) Prior Publication Data
US 2022/0161955 A1 May 26, 2022

(30) Foreign Application Priority Data

Nov. 23, 2020 (EP) .................................. 20209303
Aug. 4, 2021 (EP) .................................. 21189692

(51) Int. Cl.
*B65B 57/02* (2006.01)
*B65B 51/10* (2006.01)
*G01M 3/00* (2006.01)

(52) U.S. Cl.
CPC .............. *B65B 57/02* (2013.01); *B65B 51/10* (2013.01); *G01M 3/002* (2013.01)

(58) Field of Classification Search
CPC ......... B65B 57/02; B65B 51/10; B65B 57/20; B65B 57/00; B65B 57/101; B65B 51/227; G01M 3/002

USPC .......... 53/477, 374.2, 374.4, 329, 64, 131.3
See application file for complete search history.

(56) References Cited

U.S. PATENT DOCUMENTS

| | | | | |
|---|---|---|---|---|
| 5,568,715 A * | 10/1996 | Ebel | ...................... | B07C 5/3404 53/494 |
| 5,706,634 A * | 1/1998 | Edwards | ............... | B65B 25/008 53/247 |
| 5,870,884 A * | 2/1999 | Pike | ........................ | B65B 29/10 493/391 |
| 5,914,074 A * | 6/1999 | Martin | ............. | B29D 11/00144 425/808 |
| 7,213,382 B2 * | 5/2007 | Voss | ........................ | B29C 65/18 53/329.2 |
| 7,730,698 B1 * | 6/2010 | Montano | ........... | B29C 66/81422 219/244 |

(Continued)

FOREIGN PATENT DOCUMENTS

DE 102016117834 A1 3/2018
EP 2217428 B1 8/2010

(Continued)

*Primary Examiner* — Sameh Tawfik
(74) *Attorney, Agent, or Firm* — Dickinson Wright PLLC (57) ABSTRACT

A method for producing and inspecting a package comprising at least one product cavity of a formed part sealed by a lidding film comprises the steps of: (a) sealing the lidding film to the formed part along a seam by means of a sealing device, which comprises a sealing contour with a plurality of segments; (b) detecting, by means of the sealing device, a parameter characteristic of the sealing quality of the seam in each segment; and (c) detecting a problem with the sealing according to step (a) based on the parameter detected according to step (b) in each segment.

15 Claims, 5 Drawing Sheets

(56) References Cited

U.S. PATENT DOCUMENTS

2012/0037183 A1    2/2012   Foley et al.
2021/0276755 A1*   9/2021   Bach ................. B29C 66/53461

FOREIGN PATENT DOCUMENTS

| WO | 2005001356 A1 | 1/2005 |
| WO | 2022053574 A1 | 3/2022 |
| WO | 2022053586 A1 | 3/2022 |

* cited by examiner

METHOD AND DEVICE FOR PRODUCING AND INSPECTING A PACKAGE

RELATED APPLICATIONS

The present disclosure claims priority to and the benefit of European Application 21189692.3, filed on Aug. 4, 2021, and also claims priority to and the benefit of European Application 20209303.5, filed on Nov. 23, 2020, the entire contents of each of which are incorporated herein by reference.

FIELD

The present disclosure relates to a method and a device for producing and inspecting a package, in particular a heat-sealed plastic package.

BACKGROUND

For the packaging of products, packages are often used which comprise a product cavity in a formed part, this product cavity then being sealed by a lidding material. After the product cavity has been filled with a product, the lidding material is sealed to the formed part along a seam, which surrounds the product cavity. US 2021/0276755 A1, for example, discloses a sealing tool for producing a seam, wherein this sealing tool comprises at least two heating conductors for heating subsections of a heating element, which are actuatable in different ways. As a result, a temperature profile can be generated over the surface of the heating element in order to set a local sealing temperature precisely. The temperature can be detected by at least one sensor conductor in immediate proximity to the heating conductor, or the heating conductors can serve simultaneously as sensor conductors.

A quality feature of such packages is the shape of the seam, which shall guarantee a strong bond between the formed part and the lidding material and leak-tightness of the sealed product cavity not only immediately after production but also over a certain product life cycle or shelf life.

A possible source of defects is, for example, a fault in the sealing surface between the formed part and the lidding material caused by an improperly placed product or of certain parts of it. Other sources of defects include material defects in the formed part or of the lidding material and the presence of contaminants, which prevent the formed part and the lidding material from resting against each other completely along the sealing surface and thus make it impossible for the two components to be sealed to each other properly. Contaminations of the sealing surface can originate from the work environment of the packaging machine, or they can be in the form of solid material or fluid originating from the process of filling the product cavities if the solid material or fluid comes to rest on the areas of the formed part or lidding material to be sealed.

Devices are therefore known from the prior art for inspecting and cleaning the sealing surface prior to the sealing operation. A widely adopted method for this purpose is optical inspection, in which improperly loaded products or parts thereof and other contaminations of the sealing surface are detected by cameras. In the case of blister packs for pharmaceutical products, it is also known for example, that the products can be moved into the product cavities by means of brushes, which also have the effect of cleaning the sealing surface.

If the product cavities are to be filled with a fluid, as is the case, for example, with contact lens packages, the sealing surface of the formed part is often cleaned in an additional step after the product cavities have been filled with the fluid in order to remove any droplets which may be present from the sealing surface.

WO 2005/001356 A1 discloses for this purpose a device and method, in which each sealing surface is individually traversed by a vacuum cleaner, which removes moisture from the sealing surface. According to US 2012/0037183 A1, the formed part is guided along an absorbent material, which absorbs the liquid on the sealing surface and thus dries it. EP 2 217 428 B1, furthermore, describes a sealing tool, the contact surface of which is shaped in such a way that droplets on the sealing surface are pushed aside before the sealing operation.

BRIEF SUMMARY

It is an object of the present disclosure to provide a method and a device for producing and inspecting a package, which allow for a simple, low-cost, and reliable evaluation of the quality of the seam.

According to an aspect of the present disclosure a method for producing and inspecting a pack-age, in particular a heat-sealed plastic package, comprising at least one product cavity in a formed part sealed by a lidding film, comprises the steps of:
  a) sealing the lidding film to the formed part along a sealed seam surrounding the at least one product cavity by means of a sealing device, which comprises a sealing contour divided into a plurality of segments;
  (b) detecting, by means of the sealing device, a parameter characteristic of a sealing quality of the seam in each segment of the plurality of segments along the seam; and
  (c) detecting a problem with the sealing according to step (a) based on the parameter detected according to step (b) in each segment of the plurality of segments.

A method is thus provided, in which the sealing device is capable of detecting a parameter which is characteristic of the sealing quality of the seam and from which it is then possible to derive conclusions as to the quality of the produced seam immediately after the sealing operation. No additional devices, which, because of their construction, their drive components, and their controls, increase the complexity and cost of a packaging machine, are required for this purpose. Because the sealing contour is divided into a plurality of segments, it can be determined whether or not the seam has been formed properly in each segment. Even slight problems such as those caused by small amounts of contaminants such as dust or droplets can thus be reliably detected. Defects are therefore detected with great precision and high resolution. The produced package preferably is a heat-sealed plastic package, such as a blister pack for pharmaceuticals or a contact lens package.

In step (c), detecting a problem with the sealing means identifying or determining a problem with the sealing based on the detected parameter. The problem with the sealing may be any failure or error related to the sealing operation according to step (a). In particular, the problem with the sealing detected according to step (c) is a problem with the seam or a problem with the sealing device. Problems with or faults of the seam such as an interruption or weakening of the seam and problems with the sealing device such as a sealing temperature which is too high or too low may be caused by an incorrect sealing operation or may lead to an incorrect sealing operation and are therefore the cause of poor quality of the seam. The method facilitates to detect such problems reliably.

In a preferred embodiment, step (b) comprises detecting an actual value of the parameter in each segment of the plurality of segments, and step (c) comprises the steps of:

(c1) comparing the detected actual value of the parameter of each segment of the plurality of segments with a nominal value of the parameter defined for each segment of the plurality of segments;

(c2) determining, for each segment of the plurality of segments, whether or not there is a deviation between the actual value and the nominal value of the parameter; and (c3) detecting the problem with the sealing according to step (a) based on the deviation, determined according to step (c2), between the actual value and the nominal value of the parameter.

In other words, an actual value of the parameter is detected in each segment of the plurality of segments and a nominal value of the parameter is defined for each segment of the plurality of segments. In step (c1), for each segment, the detected actual value is compared with the nominal value, e.g. by means of a control unit of the sealing device. Based on the comparison according to step (c1) a deviation between the actual value and the nominal value can be determined according to step (c2). If a deviation is determined, this may indicate a problem with the sealing and consequently such problem is detected according to step (c3).

The sealing operation is preferably carried out by thermal sealing, i.e., heat-sealing. In this case, the seam corresponds to a heat-sealed joint. The sealing device comprises for this purpose the sealing contour, which preferably contacts the lidding film or the formed part and introduces the heat required for producing the seam. The sealing device may therefore comprise a heater, in particular an electrical resistance heater, for heating the sealing contour.

The formed part can comprise one product cavity or correspondingly a plurality of product cavities. Several formed parts may also be arranged next to each other, each formed part having one or more product cavities. Preferably, one seam surrounds each product cavity, and the sealing device comprises a plurality of sealing contours corresponding to the number of product cavities. The method according to an aspect of the disclosure is therefore applicable to these embodiments as well.

In general, the formed part can be in the form of a sheet or a web, such as a film web, preferably of a thermoplastic film. The method preferably comprises, before step (a), the steps of forming, in particular thermoforming, at least one product cavity in the film web, and of filling each product cavity with a product. The step of (thermo-) forming may comprise the steps of providing the film web, heating the film web by means of a heating device, and forming the at least one product cavity into the film web by means of a forming device. In step (a), the lidding film, which is preferably also present in the form of a sheet or a web, is sealed to the formed film web. Blister packs for medicinal or pharmaceutical products, for example, are often produced in this way.

Alternatively, the formed part may be provided to the sealing operation according to step (a) as a separately made, individual part having one or more product cavities. For example, the formed part may have been stamped or cut out of a larger unit, such as a formed film web, or, as usually in the case of contact lens packages, the formed part may be formed by injection-molding. In this case, the method preferably comprises, prior to step (a), the steps of forming the formed part by injection molding and filling the at least one product cavity of the formed part with a product.

The formed part is preferably made of plastic, in particular polypropylene. The lidding film is preferably made of a plastic film or a metal foil and can also have a multi layered configuration.

The at least one product cavity is preferably configured as a (blister) pocket in the formed part. The package can, for example, be a blister pack with one blister pocket or a plurality of blister pockets receiving medicinal or pharmaceutical products. The package can also be a contact lens package having a pocket or a plurality of pockets, each of which receiving a contact lens and a fluid. In particular in the case of these embodiments, the requirements on the quality and tightness of the sealing seam are particularly high.

Each product cavity preferably contains one product and/or a fluid such is the case with pharmaceuticals or cosmetics. If the package is a contact lens package, for example, the at least one product cavity contains a contact lens and a liquid solution, which surrounds the contact lens. If the at least one product cavity contains a fluid, such as the liquid solution, the requirements on the leakproof properties of each product cavity sealed by the seam are stringent. At the same time, the filling of the at least one product cavity with the fluid represents a significant source of faults, because drops or splashes of the fluid can easily arrive on the sealing surface.

In general, the formed part may comprise a flange, which surrounds the at least product cavity. The flange may provide a sealing surface, on which the lidding film is sealed to the formed part. The seam, which surrounds the at least one product cavity, is therefore preferably formed on the flange.

The sealing contour of the sealing device preferably comprises a shape which corresponds to the shape of the seam, in particular to the course of the seam around the product cavity. As a result, the heat input provided by the sealing device for sealing according to step (a) is effectively directed to the area of the seam to be formed.

The seam around the product cavity preferably comprises a length of between 10 and 1,200 mm, more preferably between 25 and 600 mm, and even more preferably between 50 and 150 mm. The sealing contour of the sealing device preferably comprises a corresponding length.

By dividing the sealing contour into a plurality of segments even in the case of such small seams, the detection of problems and failures as well as the evaluation of quality can be achieved with high resolution. The position of a defect and its effect on the sealing quality of the seam and of the package can thus be determined as precisely and effectively as possible.

The resolution and reliability of problem detection and quality evaluation can be further increased in a preferred embodiment, in which the plurality of segments of the sealing contour comprises at least four, preferably at least six, and even more preferably at least twelve segments. To find a good compromise with respect to the complexity of the sealing device, the number of segments of the plurality of segments is preferably no more than 45, more preferably no more than 15, even more preferably no more than 5 segments. The number of segments of the plurality of segments may be any integer number, preferably within these ranges.

In the case of conventional sealing devices, the entire sealing contour is usually heated by means of a heating cartridge acting on the entire volume of the contour. Because of the thermal inertia of such sealing devices, among other factors, it is not easy to detect deviations of parameters with the necessary accuracy and thus to detect problems with the sealing operation.

In a preferred embodiment, the sealing contour is substantially ring-shaped or annular. Preferably, the sealing contour forms a closed shape and is configured to extend around a central area in which the sealing device has no sealing contour. The substantially ring-shaped sealing contour is therefore configured in such a way that, on contact with the lidding film or formed part, it completely surrounds the product cavity in the formed part. The substantially ring-shaped form of the sealing contour is not limited to a circular ring but also comprises any desired circumferential shapes such as ellipses, polygons, and other preferably curved shapes which can surround the product cavity. In the case of a ring-shaped configuration, the length of the seam or of the sealing contour corresponds to the circumference of the seam or sealing contour, preferably along a center line of the seam or sealing contour.

In correspondence with the shape of the sealing contour, the plurality of segments of the sealing contour is preferably arranged only in an area of the seam to be formed, as a result of which the lidding film and the formed part are effectively heated in the area of the seam to be formed. Preferably only one side of the sealing contour, i.e., the side facing the lidding film, is in contact with the lidding film during step (a).

The segments of the plurality of segments of the sealing contour are preferably arranged directly adjacent to each other. Moreover, the segments of the plurality of segments are preferably arranged continuously along the sealing contour. The plurality of segments can therefore be arranged consistently along the sealing contour or seam and, in this way, steps (a) and (b) may be carried out along the entire seam.

Dividing the sealing contour into a plurality of segments does not imply that the segments of the plurality of segments must be physically/structurally divided or separated from each other on a side facing the lidding film. The division of the sealing contour into the plurality of segments can also be "imaginary" and can be determined by, for example, the way in which the sealing device functions. In particular, the division of the sealing contour can also be determined by other components of the sealing device which are in contact or functional interaction with the sealing contour, as will become evident from the description given further below.

The method may also comprise, prior to step (a), the steps of arranging the lidding film on the formed part, preferably by suctioning the lidding film by means of the sealing device and arranging of the lidding film on the formed part by means of the sealing device. For this purpose, the sealing device preferably comprises at least one suction opening, which is connected to a source of negative pressure. The at least one suction opening can be formed in the central area of the sealing device, inside the sealing contour.

In one embodiment, the sealing device detects an actual value of the parameter characteristic of the sealing quality of the seam in each segment and independently of the other segments of the plurality of segments. In addition or alternatively, each segment of the plurality of segments may heat the lidding film for the sealing operation according to step (a) substantially independently of the other segments of the plurality of segments. The segments of the plurality of segments are therefore actuatable individually.

In a preferred embodiment of the present disclosure, the sealing device comprise a plurality of heating elements and a plurality of sensor elements, wherein one heating element of the plurality of heating elements and one sensor element of the plurality of sensor elements are assigned to each segment of the plurality of segments. That is, each segment of the plurality of segments may be associated with one heating element and one sensor element. Operating data of the plurality of heating elements and/or of the plurality of sensor elements may then be used to detect the parameter, in particular its actual values, according to step (b). As a result, a particularly simple method is provided because elements which are provided for the sealing of the lidding film to the formed part can also be used simultaneously to determine the sealing quality of the seam.

The operating data can, for example, comprise a wattage (electrical power), an amperage (current) or voltage, an electrical resistance, or a temperature of the heating elements and/or sensor elements.

Preferably, each of the heating elements of the plurality of heating elements is configured to heat one segment of the sealing contour for the sealing according to step (a). The sensor elements of the plurality of sensor elements can, for example, detect the temperature in each segment.

Each heating element of the plurality of heating elements can be combined with a sensor element of the plurality of sensor elements to form an integral unit. This is possible, for example, when the heating elements are configured as wires or strip conductors and thus form an electrical resistance heater. Via the electrical resistance of a heating element of this type, which changes with temperature, it is possible simultaneously to determine its temperature. The heating element can therefore be considered a sensor element, e.g., for the resistance, the temperature, or the wattage. Additional details concerning the plurality of heating elements and the plurality of sensor elements can be derived from the description of the sealing device further below.

The detection of the parameter characteristic of the sealing quality of the seam is preferably carried out during the sealing operation according to step (a) or at the end of, i.e. upon completing, the sealing operation. Thus, appropriate values for determining the quality of the seam in question are available immediately during the generation or upon the completion of the generation of the seam. The actual value of the parameter is preferably detected simultaneously in all segments of the plurality of the segments of the sealing contour.

The result of the sealing operation according to step (a) is largely determined by process parameters including a sealing pressure, a sealing duration, and a sealing temperature. For these process parameters, appropriate nominal values are usually preset as a function of the pairing of the material of the formed part with that of the lidding film and as a function of the requirements on the seam.

The sealing pressure is preferably between 0.1 and 1 N/mm$^2$, more preferably between 0.3 and 0.6 N/mm$^2$. The sealing duration is preferably between 0.4 and 1.5 sec, more preferably between 0.8 and 1.2 sec. The sealing temperature is preferably between 150 and 250° C., more preferably between 180 and 230° C.

Temperature is often used as a control variable, wherein the sealing duration and/or temperature of the sealing device is adjusted until the temperature at the sealing site corresponds to the nominal sealing temperature. Steps (b) and (c) are preferably carried out independently of, and in addition to, this type of control of the process parameters. For a good sealing result and thus acceptable quality of the seam, it is necessary for the process parameters to be set precisely and the process parameters should not deviate from the preset nominal values outside of a very narrow tolerance range.

The parameter which is characteristic of the sealing quality of the seam, can, for example, be a resistance of a heating element of the plurality of heating elements, a temperature in a segment of the plurality of segments or of a heating element of the plurality of heating elements, or the power demand of a segment of the plurality of segments during the sealing according to step (a).

The nominal value of the parameter characteristic of the sealing quality of the seam can be a predetermined value. In this case, the nominal value may correspond to a value of the parameter which is reached in case of correct sealing and thus without the occurrence of any problem with or failure of the sealing operation and the seam, respectively. The predetermined nominal value may be determined, for example, from a plurality of preceding sealing operations, from a series of experiments, from empirical values, or from the layout and design of the sealing operation. The predetermined nominal value may also be a maximum value obtained from a large number of tests or sealing operations.

The sealing device preferably comprises a control unit, and step (c) is carried out by means of the control unit. The control unit, furthermore, can comprise a memory unit for storing the process parameters, for example, and for storing the predetermined nominal value of the parameter characteristic of the sealing quality of the seam. In one embodiment, step (c) may therefore comprise the step of retrieving the predetermined nominal value of the parameter from the memory unit.

In one embodiment, instead of using a predetermined nominal value of the parameter, step (c) of the method may furthermore comprise the step of determining at least one comparison value based on the actual values of the parameter of at least some of the plurality of segments, wherein the nominal value of the parameter then corresponds to the comparison value. For example, for detecting a problem in a first segment of the plurality of segments, the actual value of the parameter of a second segment of the plurality of segments, preferably a second segment arranged adjacent or symmetrically to the first segment with respect to the sealing contour, may be used as the comparison value. The comparison value, however, can also be an average of the actual values of a certain number of segments or of all the other segments of the plurality of segments.

If the parameter characteristic of the sealing quality of the seam is the resistance of a first heating element of the plurality of heating elements and if this value lies, for example, above or below a nominal value or deviates by more than a predefined threshold from the resistance (i.e. comparison value) of a second heating element or of several heating elements of the plurality of heating elements, it can be concluded from this that there is a defect in the first heating element. A defective heating element may have the result that the sealing contour in the segment assigned to the defective heating element is not being properly heated. Both excessive heating and insufficient heating of the lidding film and of the formed part have disadvantageous effects on the quality of the seam.

If the parameter characteristic of the sealing quality of the seam is a temperature or a temperature profile, the sealing device, according to step (b), may detect the temperature or temperature profile in each segment of the plurality of segments along the seam. If the temperature in a first segment of the plurality of segments, in particular at the end of the sealing operation, lies above or below a nominal value or deviates by more than a predefined threshold from the temperature (i.e. comparison value) of a second segment of the plurality of segments or of several segments of the plurality of segments, it is likely that a predetermined nominal sealing temperature will not be reached or maintained in the first segment. From a temperature profile of the first segment which deviates from a predetermined profile or from a profile of at least the second segment, it may also be concluded that the first segment is not being heated properly or that there is a problem with the sealing surface. Both the excessive heating and the insufficient heating of the lidding film and of the formed part have disadvantageous effects on the quality of the seam.

In an embodiment, in which the parameter characteristic of the sealing quality of the seam is the power demand of a segment of the plurality of segments during the sealing operation according to step (a), the sealing device detects, according to step (b), the power demand for each segment of the plurality of segments along the seam. For example, the power demand is the amount of power required to achieve a predetermined (nominal) sealing temperature. The required power demand can, for example, be determined from the power consumption of each heating element of the plurality of heating elements during the sealing operation according to step (a), in particular from the wattage of the heating element and the sealing duration. If the power demand of a first segment deviates from a nominal value or by a predefined threshold from the power demand (i.e. comparison value) of a second segment or of several segments of the plurality of segments, it can be concluded that, in the first segment, an undesirably large amount of energy is being consumed. This can be caused by, for example, a contamination of the sealing area, which absorbs additional heat and thus more energy.

If the method comprises step (c2) of determining of the deviation between the actual value and the nominal value of the parameter for each segment of the plurality of segments, the determination of the deviation may comprise the subtraction of the nominal value from the actual value or vice versa. If the calculated value of the deviation is equal to zero, the actual value corresponds to the nominal value. The sealing operation was conducted properly in this case, and it can be assumed that the quality of the seam is good. If the calculated value of the deviation is greater than zero, a defect could be present and the quality of the seam may not be good. Because the sealing operation can be subject to certain variations, it is preferred that a tolerance range be defined for the nominal value of the parameter or for the deviation. The tolerance may also be part of the calculation of the deviation, e.g. by using a suitable tolerance factor. If the actual value lies outside the tolerance range of the nominal value or if the determined deviation is greater than a tolerated deviation, it can be assumed that the seam is defective.

In one embodiment, the method may, after step (c), furthermore comprise the step of determining a quality of the seam as a function of the problem detected according to step (c).

For example, step (c2) may comprise the step of determining an extent of the deviation, i.e. an amount or a level of the deviation. The method may then, after step (c), comprise the step of assigning the package to a category of at least a first and a second category as a function of the determined extent of the deviation, wherein each category is characteristic of a specific quality of the seam. For example, the first category corresponds to a quality feature "OK", and the second category corresponds to a quality feature "not OK". The extent of the deviation can be the absolute value of the deviation or a relationship of the deviation to a predetermined limit value or threshold. The quality of the seam and thus of the packages can be quantified based on the extent of the deviation.

It is also conceivable that additional categories could be defined as a function of the extent of the deviation, in particular for seams found to be defective. For example, packages of the second category could comprise a seam which is continuous but relatively thin. The packages of the second category are then basically defective, but they can still be used. Packages of a third category can, for example, comprise a seam which is not continuous. The packages of the third category are thus defective and cannot be used. It is obvious that any desired number of categories can be defined.

In one embodiment, the method can, after assigning the package to a category, also comprise the step of further processing the package depending on the category to which the package was assigned, wherein the processing is different for each category. In a manner similar to the previously described exemplary embodiment, the further processing of packages of the first category can comprise the steps of finishing the package and packing the package together with other packages of the first category in an outer packaging. The further processing of packages of the second category can comprise the steps of ejecting the package and, optionally, flagging the package as defective or, for example, marking the package with an earlier expiration date. Under certain conditions, several packages of the second category can also be packaged in one outer packaging. The further processing of packages of the third category can comprise the step of ejecting the packages and the disposal of the packages.

According to another aspect of the present disclosure, a sealing device for sealing a lidding film to a formed part having at least one product cavity is provided, the sealing device comprising: a sealing contour for producing a seam, wherein the sealing contour is divided into a plurality of segments; a plurality of heating elements and a plurality of sensor elements, wherein one heating element of the plurality of heating elements and one sensor element of the plurality of sensor elements are assigned to each segment of the plurality of segments; and a control unit. The sealing device is configured to detect, by means of the plurality of sensor elements and/or the plurality of heating elements, a parameter which is characteristic of a sealing quality of the seam in each segment of the plurality of segments. The control unit is configured to detect, based on the parameter, a problem with the sealing operation.

In this manner, a sealing device is provided, by means of which, immediately after the sealing step, conclusions can be drawn concerning the quality of the seam just produced. No additional devices which, because of their structure, drive elements, and control components, increase the complexity and cost of a packaging machine are required to accomplish this. As a result of the division of the sealing contour into a plurality of segments, it can be determined, for each segment, whether the seam has been properly formed at that location. Even small problems such as, for example, those caused by small amounts of contaminants such as dust or droplets, can be reliably detected in this way. Defects are thus detected with great precision and high resolution.

The sealing device is preferably configured to implement the method for producing and inspecting a package as described herein. All features described in relation to said method are therefore applicable to the sealing device and vice versa.

The problem with the sealing operation may be any failure or error related to the sealing operation of sealing the lidding film to the formed part. In particular, the problem with the sealing operation may be a problem with the seam or a problem with the sealing device. Problems with or faults of the seam, such as an interruption or weakening of the seam, and problems with the sealing device, such as a sealing temperature which is too high or too low, may be caused by an incorrect sealing operation or may lead to an incorrect sealing operation and are therefore the cause of poor quality of the seam.

The control unit may be configured to detect the problem with the sealing operation based on operating data of the plurality of heating and/or sensor elements, as previously described.

In a preferred embodiment, the sealing device further comprises a carrier substrate, which is preferably made of ceramic material. The plurality of heating elements and the plurality of sensor elements can be provided on a side of the carrier substrate facing the lidding film. Optionally, one heating element and one sensor element can be combined to form an integral unit. The plurality of heating and/or sensor elements can be formed by wires or strip conductors, which are applied to the carrier substrate. Strip conductors can be vapor-deposited or printed directly onto the carrier substrate.

To protect the plurality of heating elements and the plurality of sensor elements, a protective layer may be provided, which covers the plurality of heating elements and the plurality of sensor elements on their side facing the lidding film. The protective layer can be a thin plate, which covers the plurality of heating and plurality of sensor elements. The protective layer, however, can also be a cover layer on the carrier substrate, into which the plurality of heating elements and the plurality of sensor elements are embedded. Preferably, at least the protective layer forms the sealing contour. Alternatively, the carrier substrate equipped with the plurality of heating elements and the plurality of sensor elements or a separate sealing component arranged on the carrier substrate or on the protective layer can form the sealing contour.

DETAILED DESCRIPTION

Figure 1:
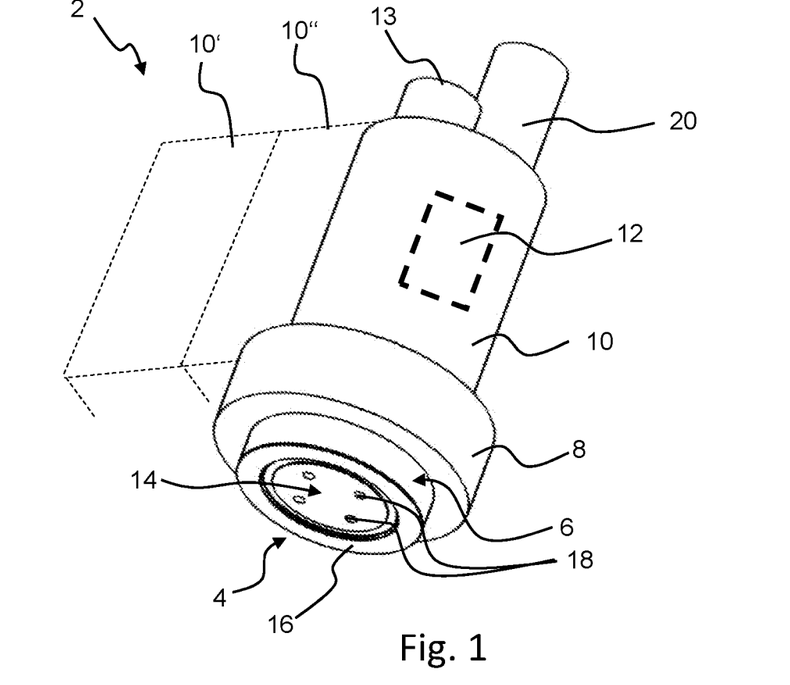
FIG. 1 shows a perspective view of an embodiment of a sealing device for producing and inspecting a package.
Figure 4A:
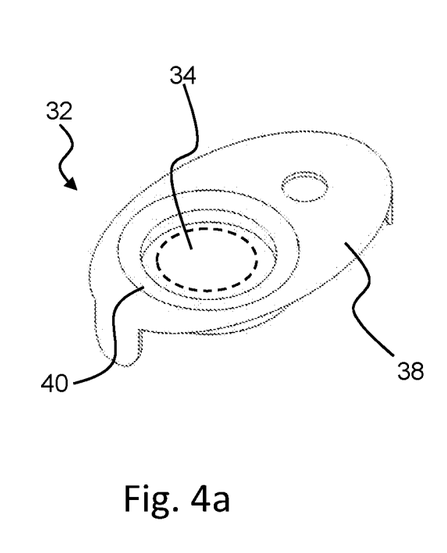
FIGS. 4a and 4b show perspective views of examples of a package with and without a lidding film.
Figure 4B:
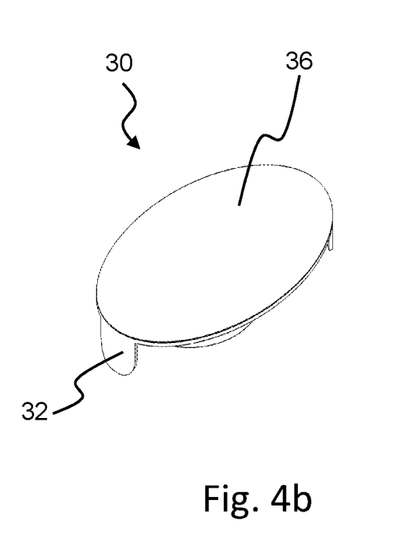

FIG. 1 shows a perspective view of an embodiment of a sealing device 2. The sealing device 2 comprises a sealing contour 4, which is configured to come into contact with a lidding film of a package to be sealed (see FIG. 4). For heat-sealing the lidding film to a formed part of the package to be sealed, the sealing device 2 comprises a heater 6, which heats the sealing contour 4 and is thus in thermally conductive contact with the sealing contour 4. The heater 6 can be connected by means of an insulating body 8 of the sealing device 2 to a housing 10 of the sealing device 2. The insulating body 8 insulates the housing 10, the components accommodated therein, and the rest of the sealing device 2 thermally from the heater 6, so that the heat it generates is conducted effectively to the sealing contour 4.

A control unit 12 for the open-loop and/or closed-loop control of the sealing device 2 can be accommodated in the housing 10, for example. The control unit 12 is connected to the heater 6. The control unit 12 and the heater 6 can be supplied with power and possibly other control signals by way of a terminal 13. It is also conceivable that the control unit 12 could be provided outside the housing 10 and that the control signals could be transmitted to the heater 6 over an appropriate line connected to the terminal 13 or wirelessly.

As shown in FIG. 1, the sealing contour 4 is substantially ring-shaped and encloses a central area 14, in which the sealing device 2 does not have a sealing contour 4. The sealing contour 4 preferably has a shape which corresponds substantially to the shape of a seam to be produced (see FIGS. 3-6), as a result of which the heat input from the sealing device 2 can be effectively directed and concentrated to the area of the desired seam. The sealing contour 4 can project beyond other components and areas, in particular beyond the central area 14. In the embodiment shown, this is achieved in that the sealing contour 4 comprises a protective layer 16, which protects the heater 6 and is made of a material having good thermal conductivity. The sealing contour 4, however, can also be configured as an integral part of the heater 6, which then has a corresponding profile.

The sealing device 2 may further comprise at least one suction opening 18 for drawing up the lidding film, thereby enabling the sealing device 2 to arrange the lidding film on the formed part prior to sealing. Here, the sealing device 2 comprises a plurality of such suction openings 18, which are connected to a source of negative pressure, such as a vacuum pump, by way of an appropriate connector 20 on the housing 10 and which are arranged within the sealing contour 4 in the central area 14 of the sealing device 2.

In one embodiment, the sealing device 2 may be configured to seal a plurality of packages or one package having a plurality of product cavities and seams at the same time. In this case, the sealing device 2 comprises a plurality of sealing contours 4 corresponding to the number of product cavities, as indicated in FIG. 1 by the housings 10' and 10" shown in broken line by way of example, on each of which a sealing contour and a heater configured analogously to that of the previously described sealing device 2 are provided.

Figure 2:
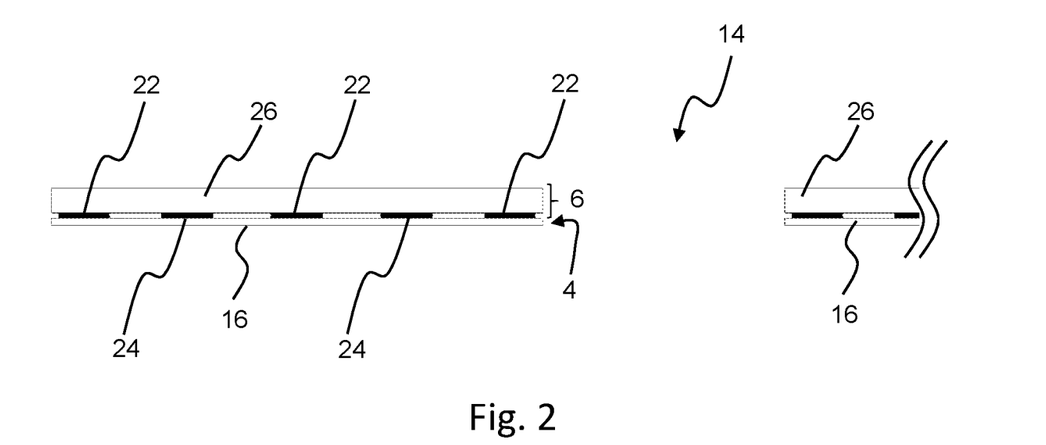
FIG. 2 shows a schematic side view of part of the sealing device according to FIG. 1.
Figure 3:
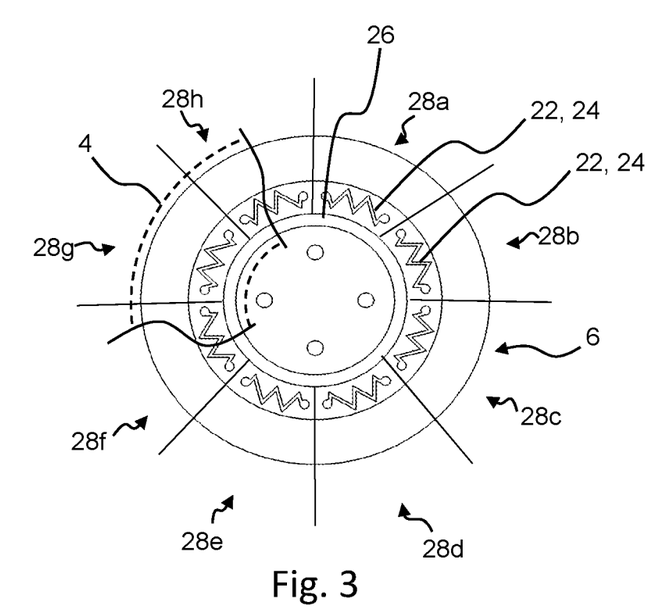
FIG. 3 shows a schematic top view of the sealing device according to FIG. 1.

FIGS. 2 and 3 show details of the sealing device 2, in particular of the heater 6. The sealing device 2, namely the heater 6 of the sealing device, preferably comprises a plurality of heating elements 22 for heating the sealing contour 4. The sealing device 2 may further comprise a plurality of sensor elements 24, which are preferably configured to detect the temperature of the heating elements 22 and/or of the sealing contour 4. The plurality of heating elements 22 and the plurality of sensor elements 24 can be configured as strip conductors, respectively, but may also be formed by wires. The plurality of heating elements 22 and the plurality of sensor elements 24 may be applied to a carrier substrate 26. For example, the strip conductors could be printed on a side of the carrier substrate 26 facing the lidding film, i.e., the side of the carrier substrate 26 facing away from the insulating body 8. The carrier substrate 26 is preferably made of ceramic material. As a result, a highly dynamic heater 6 with effective local control is provided. The protective layer 16 can cover the plurality of heating elements 22 and the plurality of sensor elements 24 to protect them from wear, as shown in FIG. 2. In the top view according to FIG. 3, the sealing contour 4 and protective layer 16 are shown only partially, in dashed line, so that the heating elements 22 can be seen more clearly.

In the embodiment according to FIG. 2, the heating elements 22 of the plurality of heating elements 22 are formed separately from the sensor elements 24 of the plurality of sensor elements 24, e.g., by separate wires, strip conductors, or sensors.

In the embodiment according to FIG. 3, one heating element 22 and one sensor element 24 are configured as an integral unit, here, for example, as a single strip conductor. That is, each of the plurality of heating elements 22 is combined with one of the plurality of sensor elements 24 in an integral element. This can be achieved, for example, in that the plurality of heating elements 22 are electrical resistance heaters. Consequently, their resistance changes as a function of temperature, the temperature thus being detectable based on the resistance of the heating element 22. Unless otherwise described, either of the two embodiments can be used as desired and combined with any of the other features of the sealing device described herein.

As can be seen from a consideration of FIGS. 1 and 3 together, the sealing contour 4 is divided into a plurality of segments 28. In the exemplary embodiment shown in FIG. 3, the plurality of segments 28 comprises eight segments 28a, 28b, 28c, 28d, 28e, 28f, 28g, 28h. The sealing contour 4 does not have to be divided structurally into segments 28a-h. For example, the sealing contour 4 can, as shown, be divided "imaginary" into segments 28a-h in correspondence with the arrangement of the plurality of heating elements 22, so that each segment 28a-h comprises one heating element 22 of the plurality of heating elements 22 and preferably one sensor element 24 of the plurality of sensor elements 24. The segments 28a-h preferably are arranged directly adjacent to each other and continuously along the sealing contour 4. Each heating element 22 heats a corresponding segment 28a-h of the sealing contour 4 assigned to it, and each sensor element 24 monitors a corresponding segment 28a-h of the sealing contour 4 assigned to it, in particular its temperature. As a result, each segment 28a-h of the plurality of segments 28 can be actuated and monitored individually.

FIGS. 4a and 4b show perspective views of a package 30, which can be produced by means of the sealing device 2 and method described herein. The package 30 comprises a formed part 32, in which a product cavity 34 has been formed, and a lidding film 36, which is sealed to the formed part 32. For the sake of illustration and clarity, the lidding film 32 is shown only in FIG. 4b, whereas, in FIG. 4a, it has been omitted to reveal the features underneath. The formed part 32 can be an injection-molded part, as used, for example, for the packaging of contact lenses, or it may be a blister pack, as used, for example, for the packaging of pharmaceutical products. The product cavity 34 is preferably configured as a pocket in the formed part 32 and preferably receives a product and/or a fluid (not shown). The formed part 32 preferably comprises a flange 38, which surrounds the product cavity 34 and contacts the lidding film 36. The lidding film 36 is sealed to the formed part 32 along a seam 40, which surrounds the product cavity 34. For this purpose, the flange 38 may provide a sealing surface, on which the seam 40 is formed.

Figure 5:
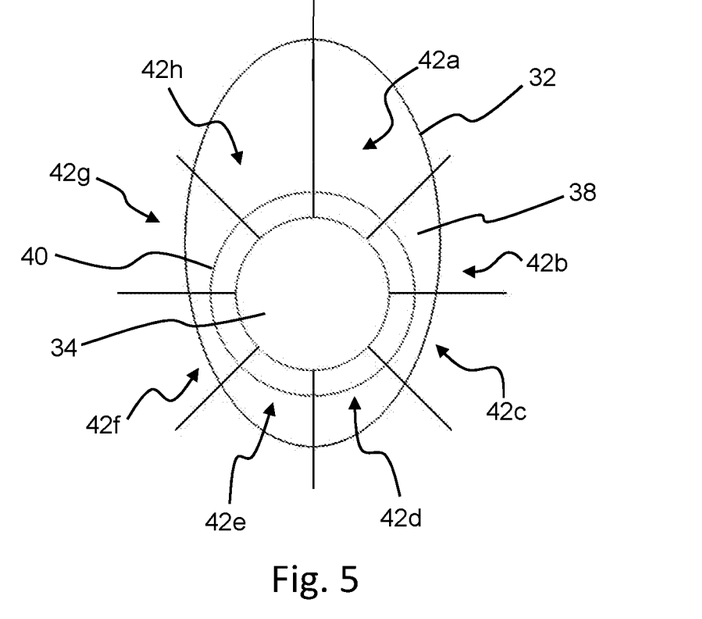
FIGS. 5 and 6 show top views of a formed part of the package according to FIG. 4.
Figure 6:
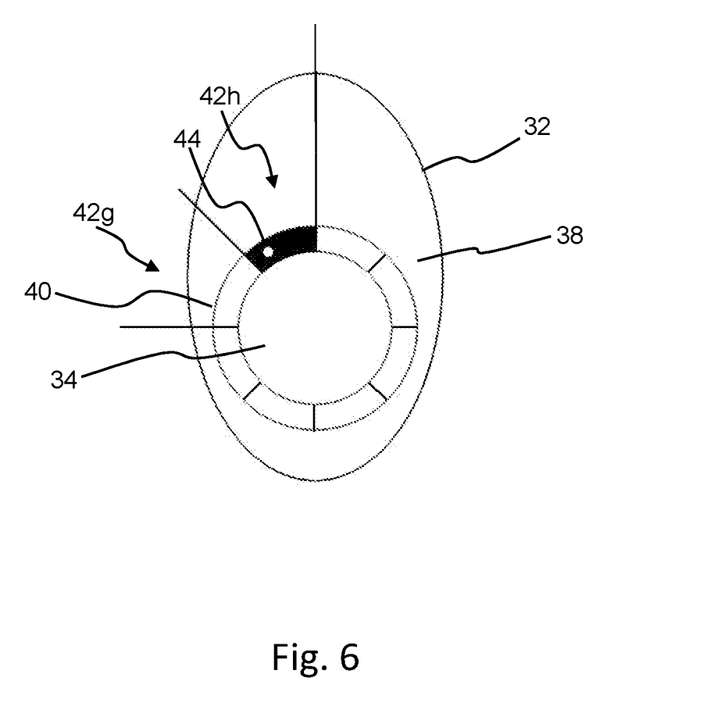

FIGS. 5 and 6 show top views of the formed part 32 of the package 30, wherein, for the sake of illustrating the seam 40 surrounding the product cavity 34, the lidding film 36, which is sealed to the formed part 32 along the seam 40, is omitted. Here it is particularly easy to see that the seam 40 completely surrounds the product cavity 34 to seal the product cavity 34 in leakproof fashion. As can be derived from FIGS. 3 and 5 in combination, the seam 40 and the sealing contour 4 of the sealing device 2 preferably have a corresponding shape, so that the sealing area is heated effectively and the seam 40 is produced all the way around the product cavity 34.

For the sake of a better understanding, the seam 40 in FIGS. 5 and 6 is divided into a plurality of sections 42a-h, each of which preferably corresponds in size and shape to one of the segments 28a-h of the plurality of segments 28. Thus a section 42a-h of the seam 40 is associated with each segment 28a-h of the sealing contour 4.

As an example of a potential problem of the sealing operation and a resulting defect of the seam 40, FIG. 6 shows a contaminant 44 in the area of the seam 40 (also referred to as area of the sealing area or sealing surface). Here the contaminant 44 is located in section 42h of the seam 40 to be formed, which can be assigned to the segment 28h of the plurality of segments 28. The contaminant 44 can, for example, result from the process of filling the product cavity 34, e.g. when a product or a part of it is not completely accommodated in the product cavity 34, or when a droplet of a fluid to be filled in the product cavity 34 finds its way onto the sealing surface. The contaminant 44 may result in the lidding film 36 not being sealed properly to the formed part 32 at the location of the contaminant 44. Therefore, no seam 40 at all or only an incomplete seam may be created at the location of the contaminant 44.

Figure 7A:
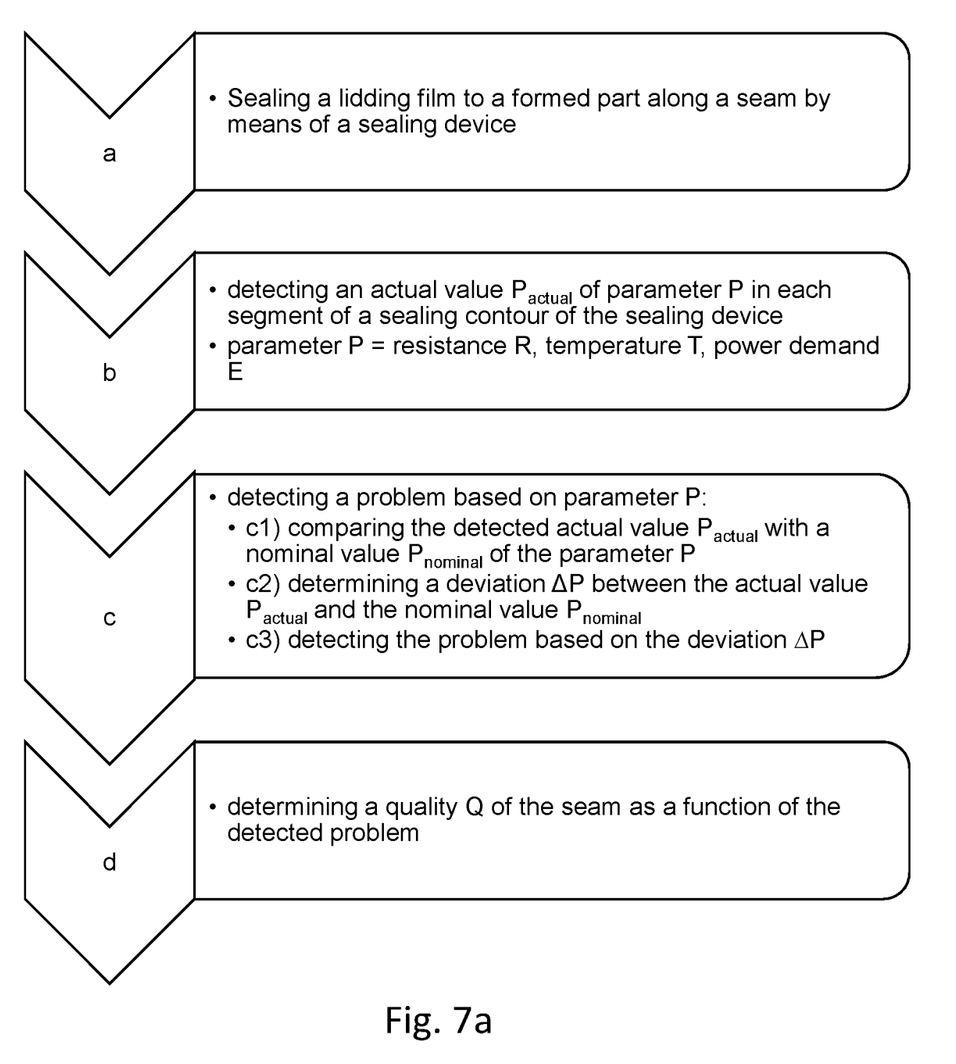
FIGS. 7a-c show flow charts of a method for producing and inspecting a package.
Figure 7B:
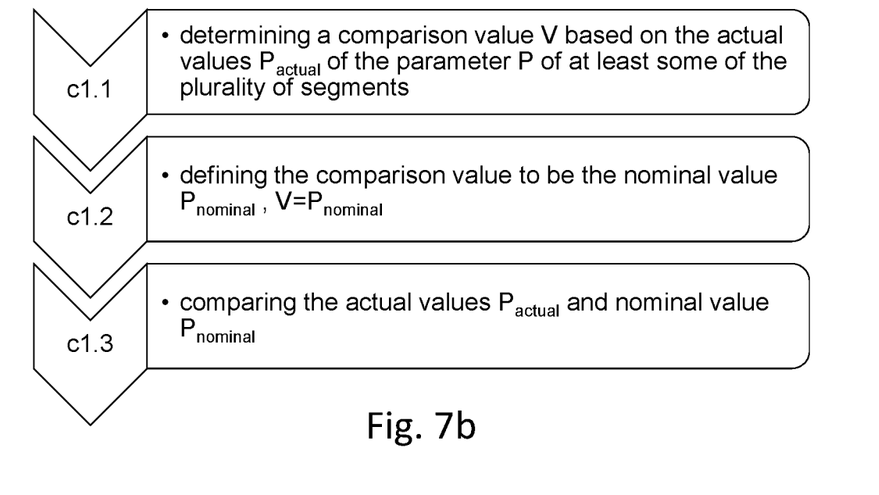
Figure 7C:
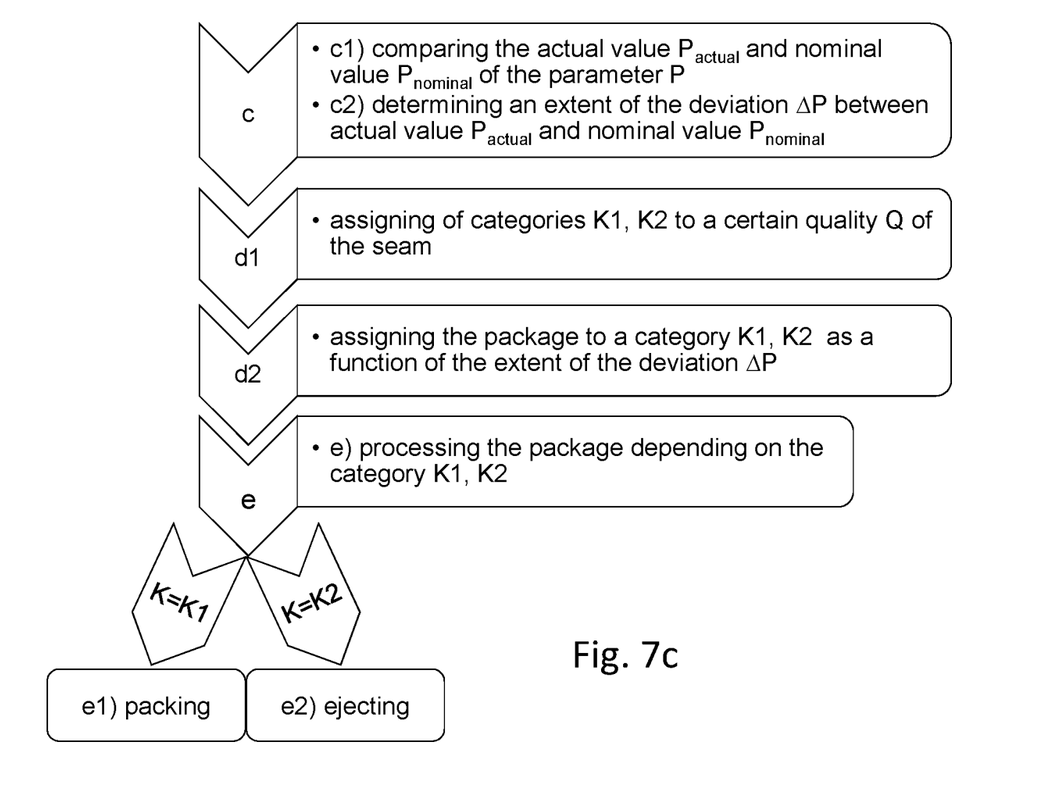

A method for producing and inspecting the package 30 as described below with reference to FIGS. 7a-c is particularly suitable for detecting problems with the sealing operation, in particular of problems resulting in an incomplete or otherwise defective seam. The steps of such method do not have to be carried out one after the other but some of them may be performed simultaneously, as will be evident from the description.

The method comprises, first, the step of sealing of the lidding film 36 to the formed part 32 along the seam 40, which surrounds the at least one product cavity 34, by means of the sealing device 2 (step (a)). The sealing device 2 comprises the sealing contour 4, which is divided into the plurality of segments 28. The sealing device 2 is preferably configured according to the embodiments described with reference to FIGS. 1-3. The sealing according to step (a) may be performed thermally, so that the package 30 which is produced is a heat-sealed plastic package such as, for example, a blister pack for pharmaceuticals or a contact lens package. The sealing operation is preferably carried out under the application of pressure and heat to the lidding film 36 and the formed part 32 in the area of the seam 40 to be produced, as is familiar to the skilled person for the production of packages of this type.

The method further comprises step (b) of detecting, by means of the sealing device 2, a parameter P, which is characteristic of a sealing quality of the seam 40, in each segment 28a-h of the plurality of segments 28 around the seam 40. For each of the plurality of segments 28, the parameter P may be, for example, an electrical resistance R of the associated heating and/or sensor element 22, 24, a temperature T of the associated heating and/or sensor element 22, 24 or of the corresponding segment 28a-h, or a power demand E of the segment 28a-h during the sealing according to step (a). The power demand but also the other parameters P, as described above, provide data on the sealing quality of the seam 40. To detect the parameter P, operating data of the plurality of heating elements 22 and/or of the plurality of sensor elements 24 can be used. The parameter P can be detected by means of the plurality of heating elements 22 and/or the plurality of sensor elements 24 and the control unit 12. It is particularly preferred in step (b) that an actual value $P_{actual}$ of the parameter P be detected.

Step (c) of the method comprises detecting a problem with the sealing operation according to step (a), in particular a problem with the seam 40 or with the sealing device 2, based on the parameter P detected in each segment 28a-h of the plurality of segments 28 according to step (b). A problem with the seam 40 can, for example, be caused by the contaminant 44 on the sealing surface (see FIG. 6). A problem with the sealing device 2 can be, for example, caused by a defective heating element 22.

It can thus be determined in a simple, quick, and accurate way whether the sealing operation according to step (a) has been executed properly in each segment 28a-h of the sealing contour 4, i.e., in each section 42a-h of the seam 40, and thus whether the seam 40 can satisfy the necessary quality requirements. It is possible to respond immediately, during the production process itself, to a failure or defect resulting from problems such as these.

In a preferred embodiment, the step of detecting a problem with the sealing operation comprises comparing the detected actual value $P_{actual}$ of the parameter P of each segment 28a-h of the plurality of segments 28 with a nominal value $P_{nominal}$ of the parameter P defined for each segment 28a-h (step (c1)) and determining, for each segment 28a-h of the plurality of segments 28, whether or not there is a deviation ΔP between the actual value $P_{actual}$ and the nominal value $P_{nominal}$ of the parameter P (step (c2)). The detection of a problem (step (c3)) with the sealing operation according to step (a) is then based on the deviation ΔP between the actual value $P_{actual}$ and the nominal value $P_{nominal}$ of the parameter P determined according to step (c2). If there is no deviation, it can be assumed that the sealing operation has been carried out properly.

The nominal value $P_{nominal}$ may be a predetermined value, which is retrieved by the control unit 12 and used for steps (c1) and (c2). As shown in FIG. 7b, step (c1) can alternatively comprise the step of determining a comparison value V based on the actual values $P_{actual}$ of the parameter P of at least some of the plurality of segments 28 (step (c1.1)) and using the comparison value V as the nominal value $P_{nominal}$ (step (c1.2)), which is then compared in step (c1.3) with the actual value $P_{actual}$ of a segment.

The method may further comprise the step of determining, in step (d), a quality Q of the seam 40 as a function of the problem detected according to step (c). A plurality of categories K may be defined for the packages to be produced, wherein each category K has been assigned to a specific quality Q of the seam 40 (step (d1)). As shown in FIG. 7c, it is preferred that step (c2) comprises the determination of an extent of the deviation ΔP, and that, after step (c), the method comprises the step of assigning the package 30 to a category K of at least a first category K1 and a second category K2, as a function of the determined extent of the deviation ΔP (step (d2)). Thus the package 30 can, for example, be assigned to the first category K1 "OK", to the second category K2 "not OK but usable", or to a third category K3 "Not OK, not usable". Of course, a categorization can also be performed if only the presence of a deviation is determined (step (c2)) rather than the extent of a deviation. For example, the first category K1 may then correspond to the feature "no deviation" and the second category to the feature "deviation".

Finally, the package 30, after having been assigned to a category K, can be processed further depending on the category K to which it has been assigned to (step (e)), wherein the processing according to step (e) is different for each category K. According to the embodiment of FIG. 7c, packages 30 of the first category K1, for example, may be packaged in an outer packaging (step (e1)), whereas packages 30 of the second category K2 and possibly of the third category K3 may be ejected from the process (step (e2)) and subjected separately to further processing or destroyed.

On the basis of the detailed description of the embodiments contained herein, the skilled person will be able to derive additional embodiments of the sealing device and of the method.

The invention claimed is:

1. A method for producing and inspecting a package comprising at least one product cavity in a formed part sealed by a lidding film, wherein the method comprises the steps of:
    (a) sealing the lidding film to the formed part along a seam, which surrounds the at least one product cavity, by means of a sealing device comprising a sealing contour, which is divided into a plurality of segments; and
    (b) detecting, by way of the sealing device, a parameter characteristic of a sealing quality of the seam in each segment of the plurality of segments along the seam,
    (c) detecting a problem with the sealing according to step (a) based on the parameter detected according to step (b) in each segment of the plurality of segments;
    wherein step (b) comprises detecting an actual value of the parameter in each segment of the plurality of segments, and wherein step (c) comprises the steps of:
    (c1) comparing the detected actual value of the parameter of each segment of the plurality of segments with a nominal value of the parameter said for each segment of the plurality of segments;
    (c2) determining, for each segment of the plurality segments, whether there is a deviation between the actual value and the nominal value of the parameter; and
    (c3) detecting the problem with the sealing according to step (a) based on the deviation between the actual value and the nominal value of the parameter determined according to step (c2).

2. The method according to claim 1, wherein the problem with the sealing detected according to step (c) is a problem of the seam or a problem of the sealing device.

3. The method according to claim 1, wherein the seam around the product cavity comprises a length which is between 25 mm and 600 mm.

4. The method according to claim 1, wherein the plurality of segments of the sealing contour comprises at least four segments.

5. The method according to claim 1, wherein the sealing contour is substantially ring-shaped.

6. The method according to claim 1, wherein the segments of the plurality of segments are arranged adjacent to each other, and wherein the segments of the plurality of segments are arranged continuously along the sealing contour, wherein step (b) is carried out along the entire seam.

7. The method according to claim 1, wherein the sealing device comprises a plurality of heating elements and a plurality of sensor elements, wherein one heating element of the plurality of heating elements and one sensor element of the plurality of sensor elements are assigned to each segment of the plurality of segments, wherein operating data of the plurality of heating elements and/or of the plurality of sensor elements is used to detect the parameter according to step (b).

8. The method according to claim 1, wherein the parameter characteristic of the sealing quality is a temperature, and wherein the sealing device, according to step (b), detects the temperature in each segment of the plurality of segments along the seam.

9. The method according to claim 1, wherein the parameter characteristic of the sealing quality is a power demand of each of the plurality of segments during the sealing according to step (a), and wherein the sealing device, according to step (b), detects the power demand of each segment of the plurality of segments along the seam.

10. The method according to claim 1, wherein the nominal value of the parameter is a predetermined value.

11. The method according to claim 1, wherein step (c1) further comprises the step of determining at least one comparison value based on the actual values of the parameter of at least some of the plurality of segments, and wherein the nominal value of the parameter corresponds to the comparison value.

12. The method according to claim 1, wherein, after step (c), the method further comprises the step of determining a quality of the seam via a function of the problem detected according to step (c).

13. The method according to claim 1, wherein step (c2) further comprises the step of determining an extent of the deviation, and wherein, after step (c), the method further comprises the step of assigning the package to a category of at least a first and a second category via a function of the determined extent of the deviation, wherein each category is characteristic of a specific quality of the seam.

14. The method according to claim 13, wherein, after assigning the package to a category, the method further comprises the step of:
    processing the package depending on the category to which the package has been assigned, wherein the processing is different for each category.

15. The method according to claim 1, wherein step b) comprises using operating data of a plurality of heating elements and/or of a plurality of sensor elements of the sealing device to detect the parameter according to step (b), wherein one heating element of the plurality of heating elements and one sensor element of the plurality of sensor elements are assigned to each segment of the plurality of segments.

* * * * *